United States Patent
Cairns et al.

(10) Patent No.: US 6,796,821 B2
(45) Date of Patent: Sep. 28, 2004

(54) FIELD INSTALLABLE CABLE TERMINATION ASSEMBLY

(75) Inventors: James L. Cairns, Ormond Beach, FL (US); Stewart M. Barlow, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 10/455,071

(22) Filed: Jun. 5, 2003

(65) Prior Publication Data

US 2003/0228783 A1 Dec. 11, 2003

Related U.S. Application Data

(60) Provisional application No. 60/386,887, filed on Jun. 6, 2002.

(51) Int. Cl.⁷ ................................................ H01R 4/64
(52) U.S. Cl. ...................................... 439/204; 439/587
(58) Field of Search ................................ 439/204, 201, 439/587, 275, 271, 277, 589; 385/75, 50, 56, 69, 64; 174/51, 65 SS

(56) References Cited

U.S. PATENT DOCUMENTS

| | | | |
|---|---|---|---|
| 2,886,626 A | | 5/1959 | Burnett |
| 3,633,155 A | | 1/1972 | Taylor |
| 3,972,581 A | * | 8/1976 | Oldham ................. 439/201 |
| 4,003,620 A | * | 1/1977 | O'Brien et al. .......... 439/204 |
| 4,519,662 A | * | 5/1985 | Riley et al. ............. 439/271 |
| 4,630,848 A | | 12/1986 | Twist |
| 4,666,242 A | * | 5/1987 | Cairns ..................... 385/75 |
| 4,773,725 A | | 9/1988 | Ashman et al. |
| 4,874,327 A | * | 10/1989 | Ip .......................... 439/275 |
| 4,907,982 A | | 3/1990 | Wagaman |
| 4,940,416 A | | 7/1990 | Wagaman |
| 5,645,442 A | | 7/1997 | Cairns |
| 5,648,639 A | | 7/1997 | Hand |
| 5,691,505 A | | 11/1997 | Norris |
| 5,771,927 A | | 6/1998 | Johansen |
| 5,873,750 A | * | 2/1999 | Cairns et al. ............ 439/587 |
| 6,112,769 A | | 9/2000 | Nicholson |
| 6,321,021 B1 | | 11/2001 | Cairns |
| 6,364,677 B1 | | 4/2002 | Nysveen |

FOREIGN PATENT DOCUMENTS

GB          2233838 A          1/1991

\* cited by examiner

*Primary Examiner*—Alex Gilman
(74) *Attorney, Agent, or Firm*—Gordon & Rees LLP

(57) ABSTRACT

A field-installable cable termination module has an outer casing having a first end for sealably receiving the end of a cable and a second end, the casing having an internal chamber. A cable carrying at least one conductor has an end extending into the first end of the outer casing. A high pressure barrier plug in the casing seals the chamber, and at least one sealed feedthrough device extends through the barrier plug for connecting the conductor to the opposite side of the barrier plug. The conductor extends from the cable end through the first chamber and is connected to the feedthrough device. The chamber is substantially filled with an initially pourable material which cures to form a solid material surrounding the conductor.

31 Claims, 6 Drawing Sheets

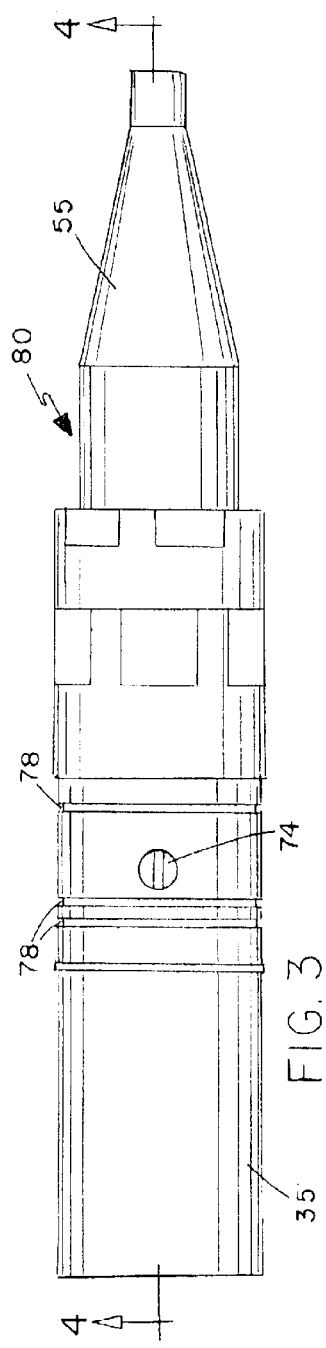
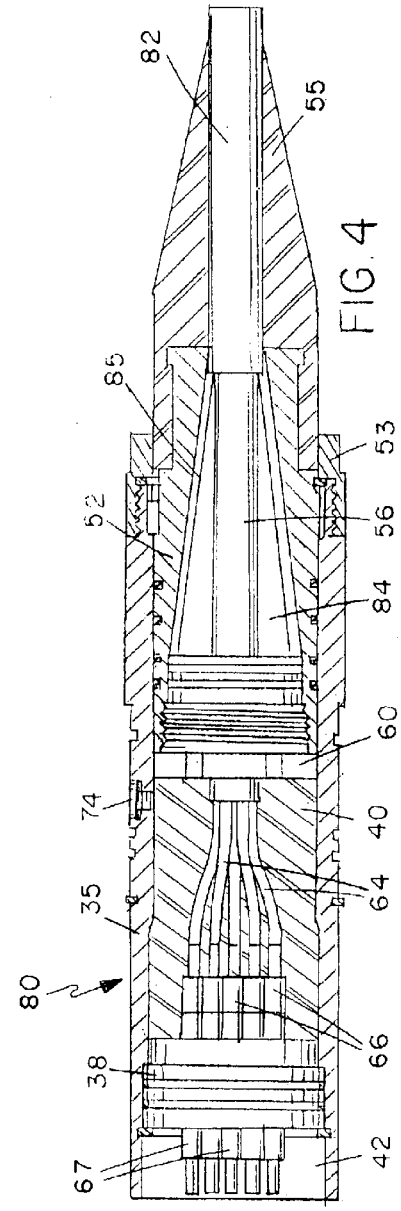

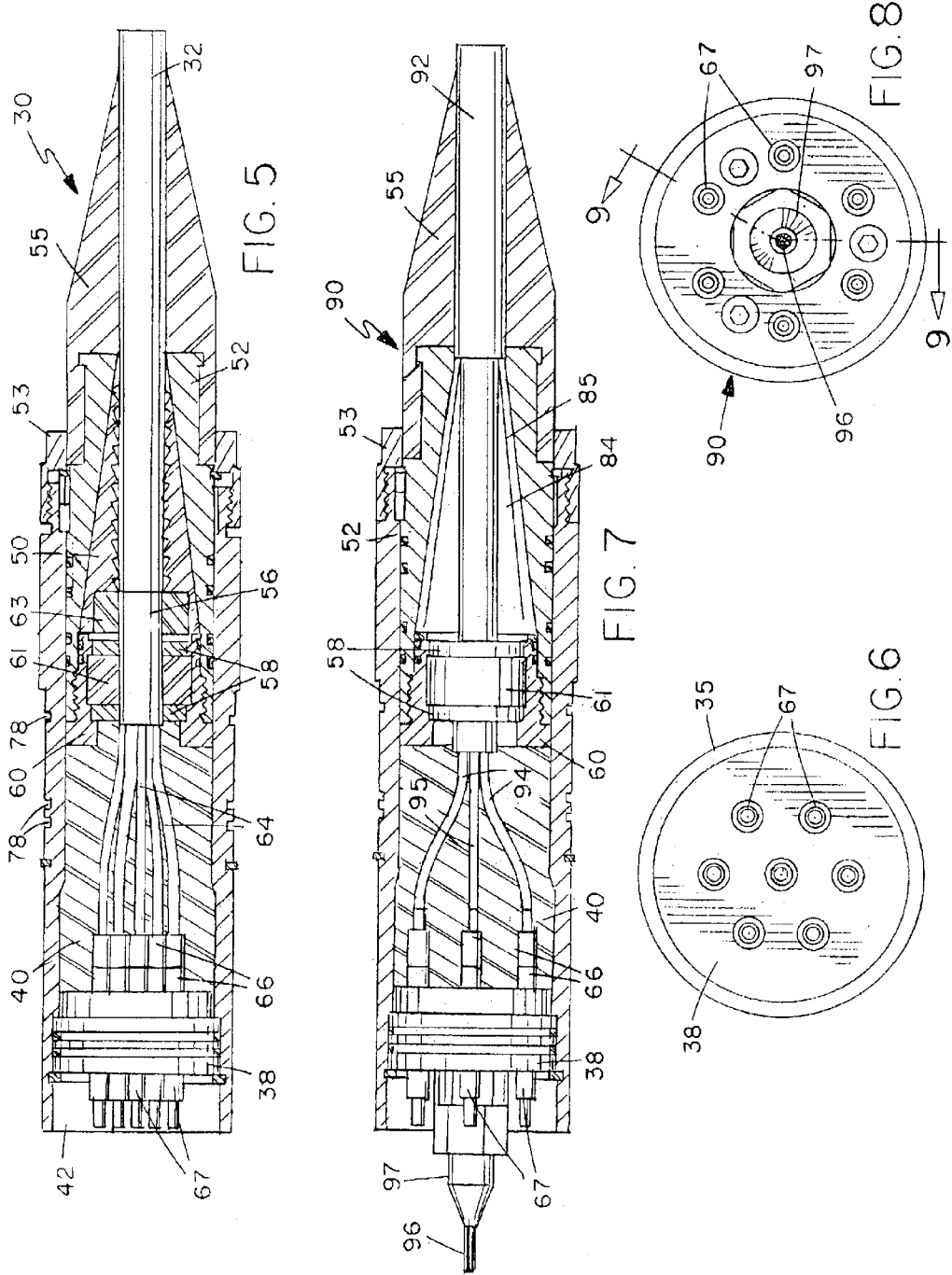

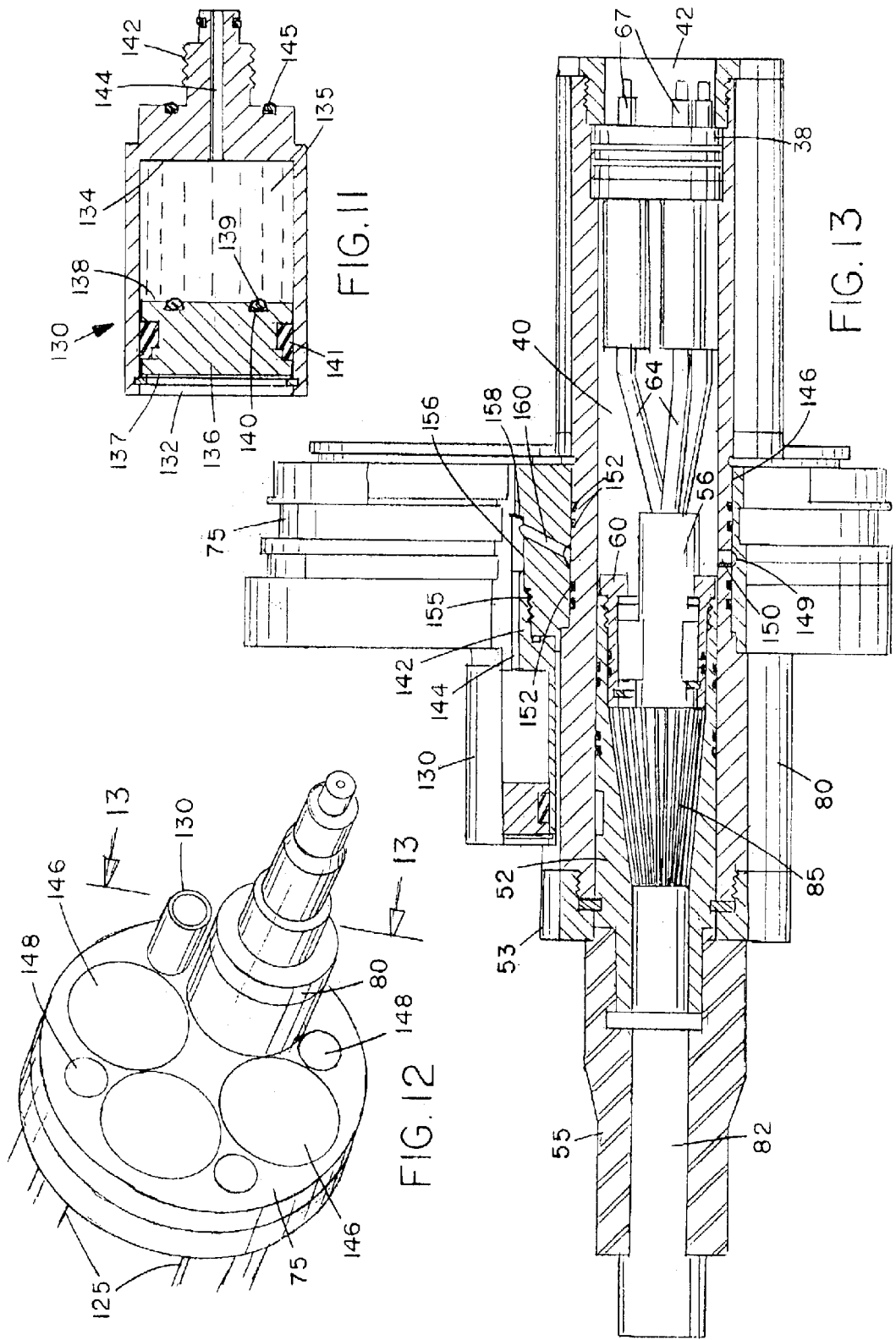

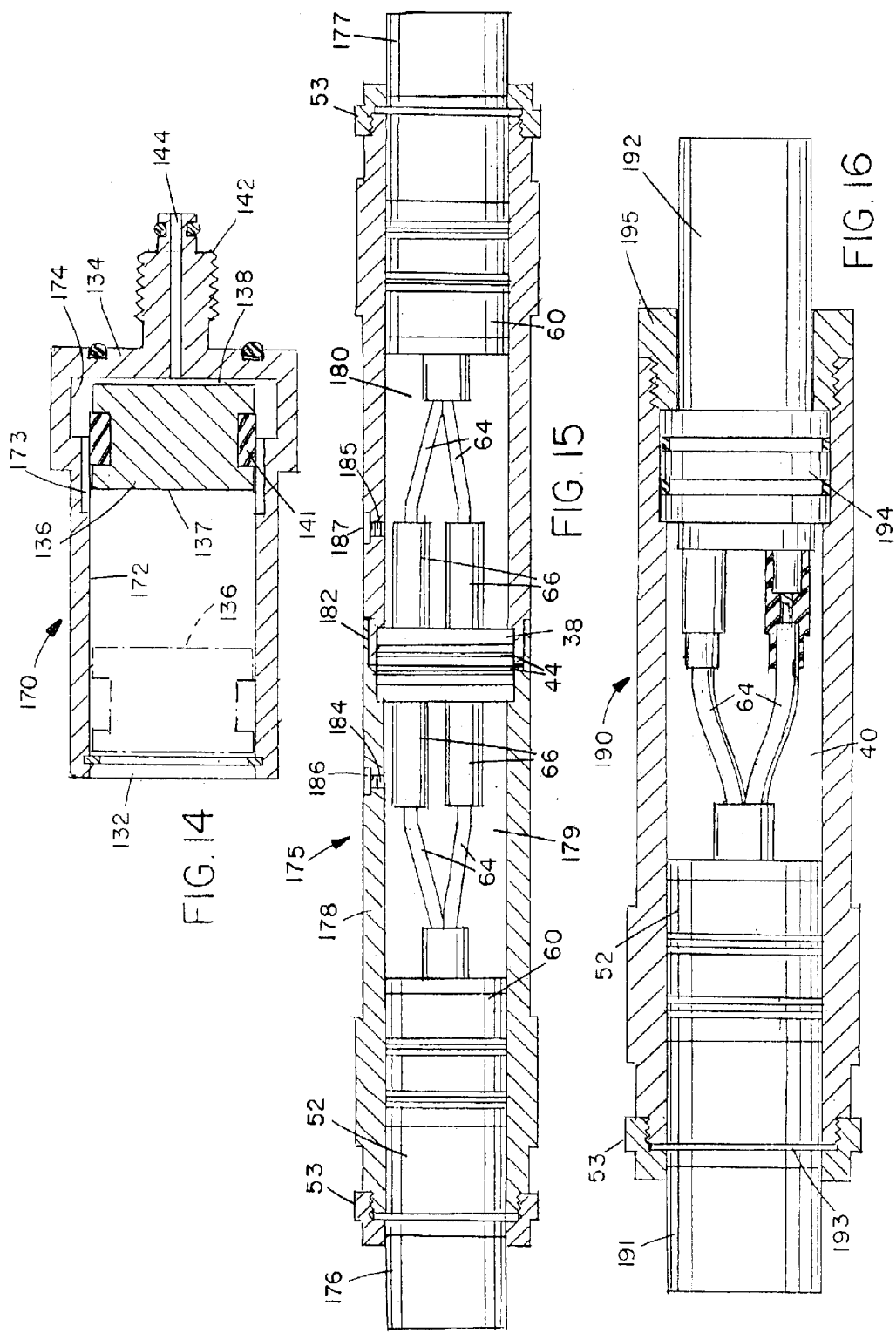

FIELD INSTALLABLE CABLE TERMINATION ASSEMBLY

CROSS-REFERENCES TO RELATED APPLICATIONS

This application claims the benefit of priority of U.S. provisional application Ser. No. 60/386,887 filed Jun. 6, 2002 which is incorporated herein by reference in its entirety.

BACKGROUND OF THE INVENTION

The present invention relates generally to a cable termination assembly, and is particularly concerned with a field installable underwater cable termination assembly for electrical, optical, or hybrid electro-optical cables.

Field installable termination assemblies are used in underwater or other high pressure environments in order to connect a cable exposed to a high pressure environment to an underwater device at a lower pressure. In the present state of the art field installable termination assemblies (FITA), conductors of the cable to be terminated fan out from the cable and are passed through one or more seals, eventually entering an oil chamber which is pressure balanced to the ambient environment. Thus, the individual jacketed wires are in the oil. As the conductors fan out from the inner core of the cable, they pass through seals at the point where they separate from each other. Break-out boot seals are typically used at the separation point for this purpose. These break-out boot seals are often in the oil chamber. In many known FITAs, both the conductors and the sealed junctions where they separate from one another are located in the oil-filled compensation chamber. The conductors then go on within the oil chamber to terminate to other conductors or to the attachment points of connectors. Again, boot seals seal these junctions. The result is that there are typically numerous seals and jacketed conductors within the oil chamber.

There are a number of problems associated with the current FITA terminations. The conductor jackets and the seals within the oil chamber are barriers which are intended to keep the high pressure oil from rushing into the cable interstices, including those between the individual stranded wires of individual conductors. If any one of these seals, or the conductor jacket, should fail, oil will be forced into the cable. The compensation chamber will then either collapse or it will spring a leak, allowing sea water to enter. The result is a catastrophic failure. Another failure mode may arise when the conductors pass from the chamber in which they exit the cable, also known as the break-out volume, into the oil-filled volume, where the conductors are unable to adequately support the hydrostatic pressure imposed in deep water. In such cases, the conductors may collapse axially and fail. U.S. Pat. Nos. 4,907,980, 4,907,982 and 4,940,416 of Wagaman et al. all describe cable termination assemblies in which the conductors extend through a cavity filled with a dielectric fluid. In U.S. Pat. No. 6,364,677 of Nysveen et al., each conductor is terminated in a separate, liquid-filled and pressure compensated interior chamber.

Another less common failure mode occurs when gel-filled cables are employed. In this mode, as cables are passed over handling devices such as pulleys, the gel is "milked" or pumped towards the terminations. This can unseat boot seals and result in subsequent failure. Still another failure mode, not well understood, occurs when cable is retrieved quickly from great ocean depths. In this case, pressurized gas may expand within the cable, and seals can be unseated. Failure can also occur when the cable is under axial compression, as can happen during handling. In this case, the cable pistons inward, passing into the compensation chamber and destroying the internal structure.

SUMMARY OF THE INVENTION

It is an object of the present invention to provide a new and improved cable termination assembly which is field installable and suitable for use in underwater cable systems. The termination assembly may connect the cable to another cable, a connector, an oil-filled hose cable assembly, or an equipment housing.

According to one aspect of the present invention, a cable termination assembly is provided which comprises an outer casing having a first end for sealably receiving the end of a cable carrying a plurality of conductors and a second end, the casing having an internal chamber, a high pressure barrier plug in the casing sealing the chamber, and a plurality of feedthrough devices extending through the barrier, the conductors in the cable extending from the cable end through the first chamber up to the barrier plug. The chamber is filled with a solid material which is initially pourable to substantially fill the chamber after the cable conductor ends are connected to the feedthrough devices on the first side of the barrier plug, and is then allowed to cure to provide a solid filler for the chamber, gripping or holding the conductors firmly in place. The material may be any suitable pourable material which cures to form a solid, such as a solid epoxy or elastomer. The material may be a dielectric, but this is not essential.

This termination assembly may be used for electrical cables, optical cables, or hybrid cables. When the termination assembly is designed to terminate electrical or hybrid cables, the individual jacketed conductors from the cable are not terminated in an oil chamber. Instead, they are terminated in a chamber containing a solid filler material. This completely eliminates all failure modes resulting from having the electrical conductors or jacketed wires of the terminated cable within the oil filled compensation chamber. The solid material which substantially fills the internal chamber will hold each conductor or wire to resist any tendency for the wire to collapse axially. A second chamber, which is oil-filled and pressure balanced, may be provided on the opposite side of the high pressure barrier or plug, with electrical conductors or wires connecting each feedthrough device through the second chamber to an oil filled hose assembly or the like within an equipment housing at a lower pressure than the surrounding environment. With this arrangement, an impenetrable barrier is provided between the cable which is exposed to the high pressure environment and the oil filled, pressure balanced chamber, substantially or completely avoiding the potential failure modes when oil is forced into the cable or due to axial collapse of a conductor.

In the case of a hybrid cable carrying both optical fibers and electrical conductors, the arrangement will be similar except that an optical fiber end seal assembly will be provided in the barrier for feedthrough of the optical fibers, for example the end seal assembly as described in U.S. Pat. No. 6,321,021 of Cairns et al., the contents of which are incorporated herein by reference. In the case of an optical cable, the barrier plug will have one or more optical fiber end seal assemblies only.

The cable which is terminated may be either armored or unarmored. Two such cable termination assemblies may be secured back-to-back to form a cable-to-cable splice. In this case, the oil filled compensation chamber could be eliminated, and solid filler material may fill the chamber on each side of the barrier or penetrator. Alternatively, the cable may be terminated to one half of an underwater connector of any type, with the barrier being replaced by the connector end wall and the conductors in the cable connected to terminals in the connector half.

The assembly of this invention provides a fully sealed, high pressure, field-installable cable termination assembly configured to allow termination of cables independent of their construction at high ambient pressures. Where one or more cables are to be terminated, the or each cable will be terminated to a respective module forming a high pressure barrier, and the or each module in turn will connect to the oil filled compensation chamber through an end wall of the compensation assembly, which may be mounted in a panel or bulkhead of an equipment housing. The respective modules provide full mechanical and pressure barriers for the cable to compensation chamber interface. Since individual electrical conductors do not enter the compensation chamber, the most common failure modes are eliminated. The solid material filling the module chamber diminishes cable pistoning due to changing pressure or handling of the cable.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 3 is a side elevational view of a modified, armored electrical cable termination module according to another embodiment of the invention;

FIG. 4 is a cross-section on the lines 4—4 of FIG. 3;

FIG. 5 is a partial cross-section similar to FIG. 4 illustrating a cable termination module for an unarmored electrical cable;

FIG. 6 is a left hand end view of the module of FIG. 5;

FIG. 7 is a cross-section similar to FIGS. 4 and 5 illustrating a hybrid cable termination module according to another embodiment of the invention;

FIG. 8 is a left hand end view of the module of FIG. 7;

FIG. 11 is a cross-section through a pressure compensating unit for association with a cable termination module;

FIG. 12 is a perspective view of a modified multiple cable termination assembly with seats for pressure compensating units as illustrated in FIG. 11 in the end wall and associated with each of the cable termination modules;

FIG. 13 is a cross section on the lines 13—13 of FIG. 12, illustrating the connection between one pressure compensating unit and the associated cable termination module;

FIG. 14 is a cross-sectional view similar to FIG. 11 illustrating a modified pressure compensating unit;

FIG. 15 is a cross-sectional view of a cable-to-cable splice according to another embodiment of the invention; and FIG. 16 is a cross-sectional view illustrating a cable to connector termination according to another embodiment of the invention.

DETAILED DESCRIPTION OF THE DRAWINGS

Figure 1:
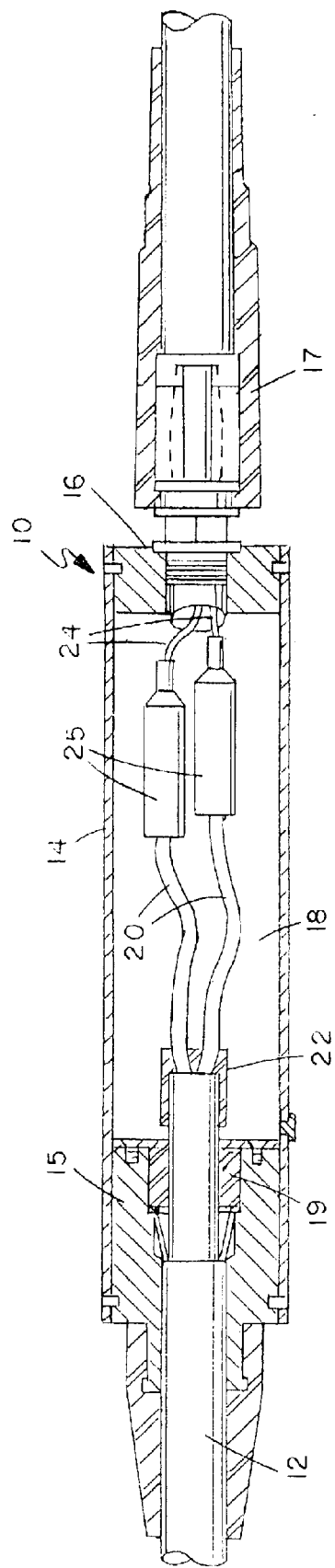
FIG. 1 is a cross-sectional view of a prior art cable termination assembly to an oil-filled hose.

FIG. 1 of the drawings illustrates a typical prior art cable termination assembly 10 for an electrical armored cable 12. The assembly basically comprises an outer casing 14 having a first end wall 15 at one end into which the end of cable 12 extends, and a second end wall or plug 16 at the opposite end connected to an oil filled hose assembly 17 connecting the FITA to remote connectors in a manner known in the field. An oil filled, pressure balanced chamber 18 extends between the two end walls 15, 16.

Individual jacketed electrical wires 20 in cable 12 are extended out of the cable end and separated via a break-out boot seal 22 in chamber 18. The separated wires 20 then extend through the chamber 18 and are connected to other conductors 24 or to the attachment points of connectors, with boot seals 25 sealing these junctions. The core of cable 12 is sealed by end seal 19 at the junction between end wall 15 and chamber 18. Seal 19 is another potential leak point. There are therefore numerous seals 19,22,25 and jacketed conductors 20 within the oil chamber 18. This can result in many different failure modes, as discussed above.

Figure 2:
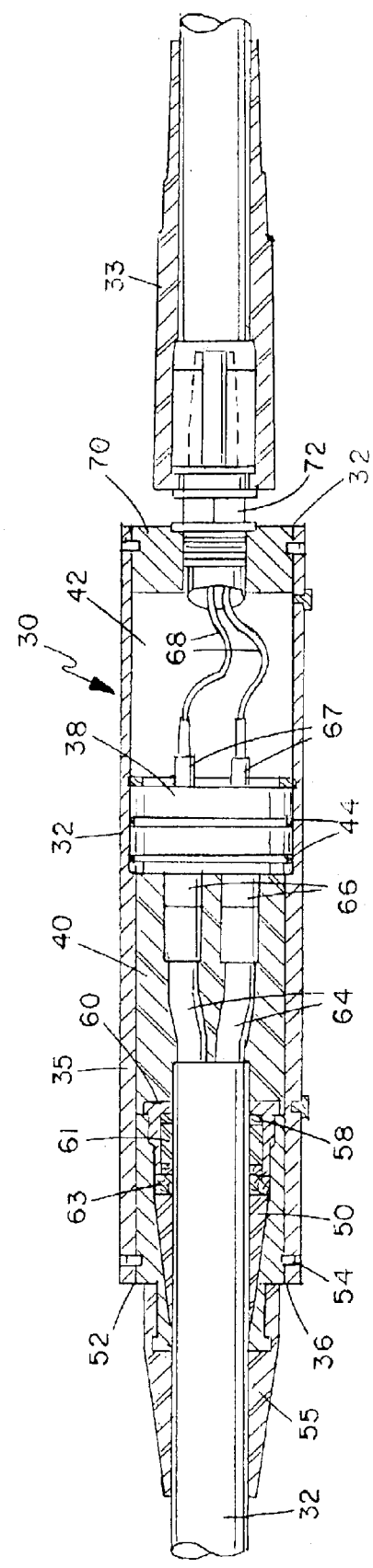
FIG. 2 is a cross-sectional view of a single, unarmored electrical cable termination module according to a first embodiment of the invention, here shown connected to an oil-filled hose.

FIG. 2 illustrates an electrical penetrator or cable termination module 30 for an unarmored cable 32 according to a first embodiment of the present invention. FIG. 2 illustrates the module connected to an oil-filled hose assembly 33 for connection to remote connectors. The module 30 may alternatively be connected to one end of a termination assembly for a plurality of cables and penetrator modules, as will be described in more detail below in connection with FIG. 10, or to a cable or a connector half.

Figure 9:
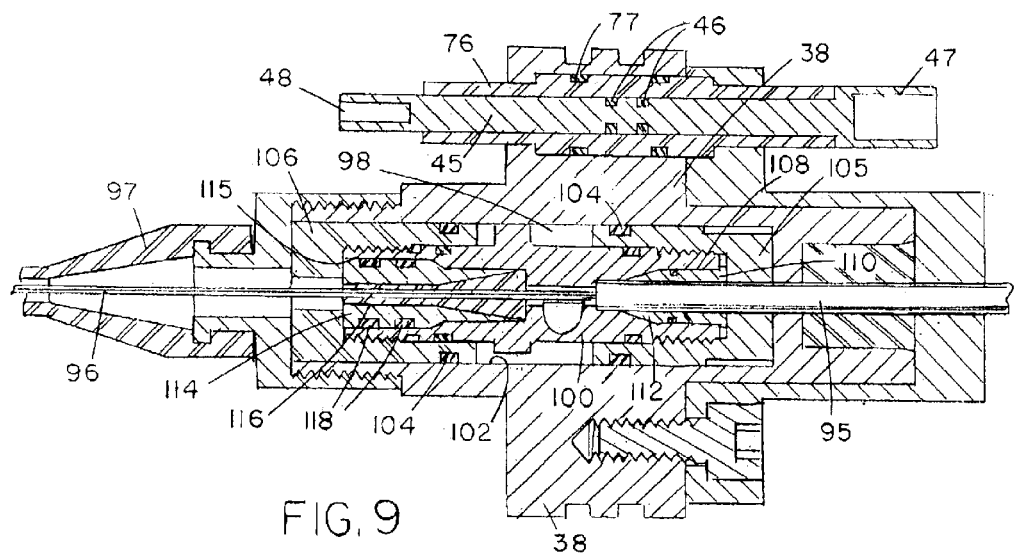
FIG. 9 is an enlarged cross section through the high pressure barrier of FIGS. 7 and 8 on the lines 9—9 of FIG. 8.

The module 30 basically comprises an outer cylindrical casing 35 having a first end 36 for receiving the end of cable 32 to be terminated, and a second end 37. A high pressure barrier or penetrator 38 of dielectric material is mounted in the casing 35 to separate the casing into a first chamber 40 between the first end 36 and the barrier, and a second chamber 42 on the opposite side of the barrier. The penetrator 38 forms a high pressure barrier between chamber 40 and chamber 42, and a plurality of O-ring seals 44 are provided between the outer surface of penetrator 38 and the inner wall of casing 35. A plurality of sealed electrical feedthroughs or metal rods 45 extend through bores in the penetrator 38, one of which is illustrated in cross-section in FIG. 9. FIG. 9 also illustrates an optical feed through device 98. However, it will be understood that a barrier 38 in a termination module for an electrical-only cable, as in FIG. 2, will have only electrical feedthroughs.

Each rod 45 is sealed in the respective bore by O-ring seals 46. Each rod 45 and its O-rings 46 are encased by an outer tube 76 of hard dielectric material, and the dielectric tube or casing 76 has two external O-rings 77. The rod and dielectric tube 76 are fitted into a precision bore in the penetrator 38, as best illustrated in FIG. 9. The external O-rings 77 form a double seal to the penetrator through bore and the internal O-rings 46 on the rod seal the interfaces to the dielectric casing 76. Thus, the electrical path from chamber 40 is advanced through the sealed solid rod 45 into the oil chamber 42, and each solid rod 45 is doubly sealed by O-rings, reducing any risk of leakage of oil. Solder pots 47,48 are provided at each end of each of the electrical feed through rods.

Cable 32 extends in through the end 36 of casing or shell 35 and is secured in the end 36 via a cable grip 50 which engages the outer jacket of the cable as indicated in FIG. 2. The cable grip 50 is held in a tapered bore in socket member 52 which is secured in the shell 35 via an end nut (not shown in FIG. 2) and an annular lock ring 54. A boot seal 55 engages over the end portion of the cable protruding out of the casing 35. Cable 32 projects through aligned bores in a pair of end plates 58 into the chamber 40. End plates 58 are held in position by nut 60, which screws into a threaded portion at the inner end of socket member 52. A gland seal 61 between end plates 58 provides a seal between the outer surface of core 56 and the inner surface of nut 60. Nut 60 presses against forward extension tabs (not illustrated) of grip 50. Rigid filler material 63 rotationally locks grip 50, and hence cable 32, to the casing. This arrangement is illustrated in more detail in FIG. 5.

The portion of the cable projecting into the chamber 40 has the outer jacket stripped off to reveal the individual jacketed electrical wires or conductors 64. Conductors 64 are fanned out in chamber 40 and are each soldered to a respective solder pot 47. In certain cases, a boot seal may be provided where conductors 64 break out of cable 32 to prevent injected material from flowing into the cable during potting. The base of each solder pot 47 is encapsulated by a rigid dielectric material, and the dielectric base provides a sealing surface for a boot seal 66 forming a bridge between the dielectric base to the insulating wire jacket, sealably containing the wires. The solder pots 48 on the opposite side of the high pressure penetrator or barrier plug 38 are also covered by boot seals 67, and are soldered to a series of selected standard wires 68, which pass through the oil chamber 42 and are eventually terminated to a connector or other device. In the embodiment illustrated in FIG. 2, wires 68 extend out through an end plug 70 in the second end 37 of the casing 35 and through a sealed connector 72 into the oil filled hose assembly 33.

Figure 10:
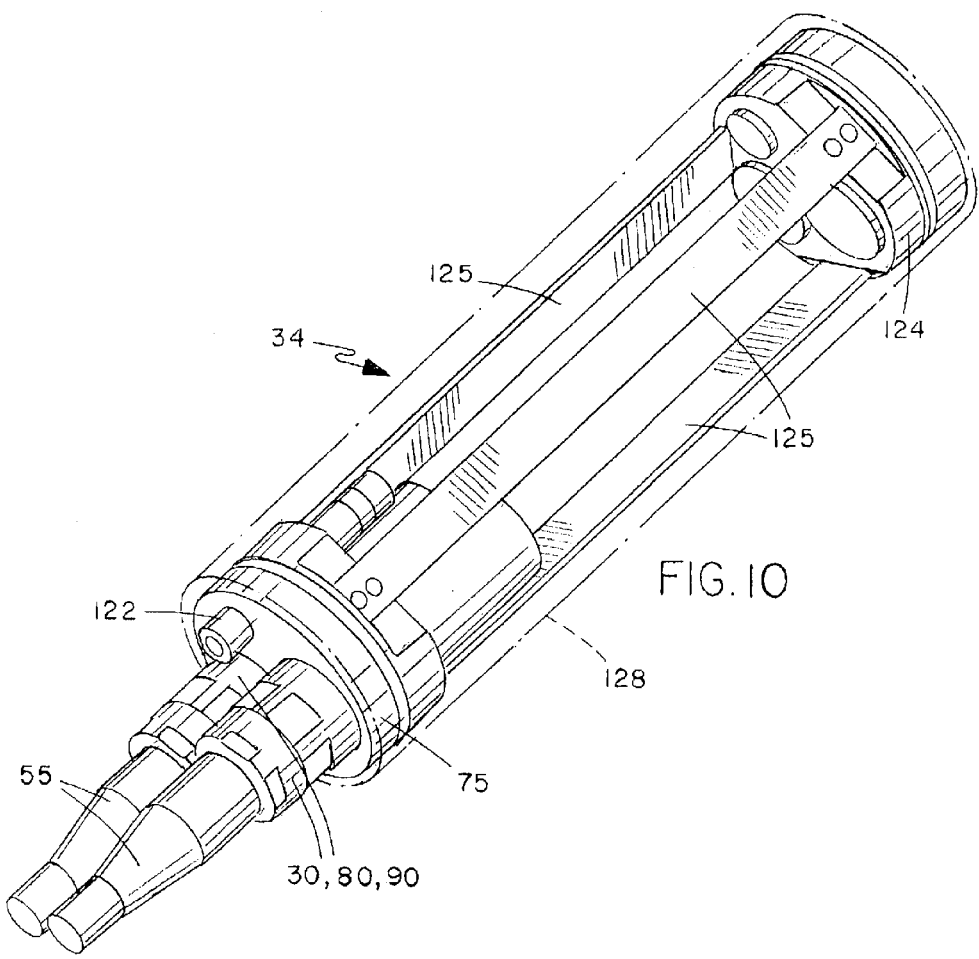
FIG. 10 is a perspective view of a multiple cable termination assembly according to another aspect of the invention using two or more of the cable termination modules of the previous embodiments.

FIGS. 5 and 6 illustrate a modified version of the unarmored cable termination module 30 of FIG. 2, which may be secured in one end of a multiple cable termination assembly 34 as illustrated in FIG. 10, may be secured to another cable, cable connector, equipment housing or the like. The majority of the parts illustrated in FIG. 5 are identical to those of FIG. 2, and like reference numerals have been used as appropriate. In FIG. 5, the cable end portion projecting into the shell 35 through the cable grip 50 has the outer jacket stripped off to reveal the inner core 56, and core 56 proceeds through end plates 58 and gland seal 61 in the end nut 60 into chamber 40, where it is stripped off to expose the individual jacketed wires 64. End nut 53 is illustrated in FIG. 2 gripping the boot seal 55 and securing the socket member 52 in position. Cable grip 50 has forward extension tabs with inner scallops extending up to end unit 60. As in FIG. 2, the space between cable core 56 and the extension tabs of grip 50 is substantially filled with solid filler material 63, rotationally locking grip 50 and cable 32 to the casing.

In each of the above embodiments, once the individual wires 64 of the cable have been secured to solder pots 47 and the junctions have been sealed, the chamber 40 is filled with a pourable material via a fill port (not visible in FIGS. 2 or 5). The pourable material then cures to form a solid filler in chamber 40. Any suitable pourable material which cures to form a solid may be used as the filler material in chamber 40. The material must be sufficiently solid when cured to grip the conductors and hold them in position, resisting axial collapse of the conductors or wires. It may be a pourable epoxy, or an elastomer with a sufficiently high durometer to grip the conductors when cured, such as a high durometer polyurethane. In one exemplary embodiment, the filler material was Scotchcast 4 electrical insulating epoxy resin sold by 3M Corporation of St. Paul, Minn. Although the pourable material is a dielectric in the exemplary embodiment, other, non-dielectric pourable materials may alternatively be used, as long as they cure into a solid which is sufficiently rigid to grip the individual conductors.

The fill port may be subsequently sealed with a suitable sealing cap. Alternatively, where the module 30 is to be secured, along with other cable termination modules, into an end wall 75 of the multiple cable termination assembly of FIG. 10, O-rings engaging in annular grooves 78 on each side of the fill port may form a seal between the casing 35 and the port in the end wall 75 through which it projects, thus sealing the fill port.

FIGS. 3 and 4 illustrate a modified electrical penetrator or termination module 80 for an armored cable 82. Some parts of the module in FIGS. 3 and 4 are identical to the embodiment of FIGS. 2, 5 and 6, and like reference numerals have been used for like parts as appropriate. The only difference between this module and that of the previous embodiment is that the cable grip 50 is eliminated, and instead the outer jacket of cable 82 is stripped off at the point it enters the socket member 52, and the entire internal bore of member 52 up to the tightening nut 53 comprises a chamber 84 in which the stripped cable armor 85 is terminated. Chamber 84 is filled with pourable material, like chamber 40, which cures into a solid material to hold armor 85. As in the previous embodiment, the inner core 56 extends through end plates and a seal member in nut 53 and into chamber 40, where it is stripped to reveal the individual jacketed wires 64 which are soldered to the respective solder pots 47 as in the previous embodiment, before filling the chamber 40 with pourable material via fill port 74.

In both of the above embodiments, there are several advantages over prior art cable terminations. One critical advantage is that the conductors from the cable do not themselves penetrate the oil chamber. Instead, they are terminated at the sealed high pressure penetrator or barrier 38, and the electrical path is continued into the oil chamber 42 by solid conductive rods 45, each of which is doubly sealed by O-rings. The penetrator provides a full mechanical and pressure barrier for the cable to compensation chamber interface. Since the individual cable conductors do not enter the oil filled compensation chamber, the most common failure modes are reduced or eliminated. The penetrator or pressure barrier design with a solid filler eliminates the need for breakout boot seals in the oil chamber, which are commonly used in prior art termination assemblies and which cause problems. The solid filler material in the chamber 40 diminishes cable pistoning due to changing pressure or handling, and also further reduces the risk of high pressure oil leakage back into the cable.

FIGS. 7 to 9 illustrate a hybrid electro-optical armored cable penetrator module 90 according to another embodiment of the invention. Module 90 is designed to terminate a cable 92 carrying both electrical and optical circuit members, comprising electrical wires 94 and an outer tube or core 95 carrying a bundle of optical fibers 96. Some parts of the module 90 are identical to the previous embodiment, and like reference numerals have been used for like parts as appropriate. As in the previous embodiments, each of the electrical wires 94 is soldered to a respective solder pot 47 on one side of the dielectric, high pressure penetrator or barrier 38, and a solid rod continues on to the other side of the barrier 38, where it is soldered to a standard wire which continues on through the oil chamber 42. However, the tube or core rod 95 carrying the fibers 96 extends into an optical end seal assembly 98 (see FIG. 9) which extends through a sealed bore in penetrator 38, and the fibers 96 extend out through strain relief or boot seal member 97 into the oil-filled chamber 42. The optical end seal assembly 98 may be the same as described in U.S. Pat. No. 6,321,021 of Cairns et al., the contents of which are incorporated herein by reference.

As best illustrated in FIG. 9, optical end seal assembly 98 is sealed in a through bore 102 in penetrator 38 via a series of O-ring seals 104. Assembly basically comprises a tubular conduit or body 100 with opposite end nuts or retainer nuts 105,106 threadably engaged with opposite ends of body 100. The outer tube 95 carrying the bundle of optical fibers 96 extends into body 100 through end nut 105 and has an inner end which terminates in bore portion 108 of the outer body 100, with the optical fibers extending on out of the end of tube 95 through the body 100 and out of the opposite end of the seal assembly. The outer tube 95 is secured in position by jam bushing 110 and tube grip 112. A seal member 114 is seated in a seat 115 in the tubular body 100 and has a central through bore 116 through which the fibers project. Suitable seals 118 such as gland seals or O-ring seals are mounted in the outer surface of the seal member 114. Through bore 116 is filled with a pourable material which cures to form a solid material, sealing to the inner surface of bore 116 and to each of the optical fibers, thus providing a seal between the two chambers 40 and 42.

It will be understood that a cable termination module for an unarmored hybrid cable will also be provided. This will be identical to that of FIGS. 7 to 9, except that the dielectric filled chamber 84 will be eliminated and replaced by a cable grip 50 as illustrated for the unarmored electrical cable of FIG. 5. The cable termination module of this invention may be designed for electrical cables, hybrid electro-optical cables, or optical cables. In the latter case, the design will be similar to that of FIGS. 7 to 9, except that the electrical wires and electrical passthroughs of FIGS. 7 and 9 will be eliminated, and one or more rods carrying bunches of optical fibers will extend through chamber 40 to one or more optical end seal assemblies extending through barrier 38.

In an alternative arrangement, multiple optical-only cables may be terminated within one termination module or housing, by increasing the housing diameter and diameter of the high pressure barrier 38, and providing an end plug in the housing with bores for receiving the ends of each cable. The barrier will have a plurality of optical end seal assemblies 98 corresponding in number to the number of optical cables.

FIG. 10 illustrates a cable termination assembly 34 according to another embodiment of the present invention which incorporates one, two or more of the electrical, optical, or hybrid, unarmored or armored cable termination modules of the previous embodiments, and may also incorporate an optical feedthrough module 122 for optical cable. Each of the modules 30,80 and/or 90 and optical feedthrough 122 is sealed in a respective through bore in a first end wall 75 of assembly 34, and chambers 42 will each communicate with a suitable pressure compensated oil chamber (not illustrated) extending to the opposite end wall 124 of the assembly.

In FIG. 10, multiple modules are connected to end wall 75. However, a similar arrangement may be used for only one cable termination module. One or more such modules may also be connected to the opposite end wall 124. End wall 75 may be mounted in a panel or bulkhead of an underwater equipment housing, and the assembly allows various cables to be connected through an oil filled, pressure compensated chamber to components within the housing. The various electrical wires and optical fibers extending through the compensator chamber will be connected to suitable terminals or other connector devices at end wall 124 in a known manner. It will be understood that the assembly 34 will have an outer rigid case or housing 128, illustrated schematically in FIG. 10, extending between and sealed to the end walls 75 and 124 and enclosing the assembly. The compensated oil chamber will include some type of flexible element or bellows for pressure compensation purposes. Additionally, rigid bars 125 extend between the end walls 75,124 to provide additional support. Bars 125 form a rigid internal skeleton which will take the tensile load of the cables which are terminated to the assembly. A fiber management system (not illustrated) will be provided for taking up slack in the optical fibers extending through the compensator.

In this assembly, individual cables, whether optical, electrical, or hybrid, and armored or unarmored, are each terminated to a respective module 30,80, or 90 as appropriate depending on the type of cable. The respective modules each form a high pressure barrier, and the modules in turn are mounted to extend through the end wall of the multiple cable termination assembly 34. The advantages of the modular structure are ease of handling, installation, repair, and individual testing, as well as reduced manufacturing cost and reliability. Traditional FITAs pass the cable tensile load through the termination case. The cable termination assembly of FIG. 10 passes the cable tensile load to the internal skeleton of the case, allowing lighter, less expensive outer cases.

FIG. 11 illustrates one possible pressure compensator unit 130 which may be used with any of the cable termination modules or penetrators described above, in order to compensate for pressure variations and fill any gaps which may be left in the solid material in chamber 40. FIGS. 12 and 13 illustrate mounting of one or more compensator units 130 in the end wall 75 of the multiple cable termination assembly of FIG. 10, adjacent respective modules, with the outlet of each compensator communicating with the solid material filled chamber 40 of a respective termination module. It may not be necessary to provide a compensator unit for all of the modules. Apart from the addition of compensator units 130 and the connecting passageway between each unit 130 and the adjacent cable termination module, the structure is otherwise the same as that of FIG. 10, and like reference numerals have been used for like parts as appropriate.

Each compensator unit 130 basically comprises an outer housing or cylinder having an open outer end 132, opposite end wall 134, and a chamber 135 within the housing which is filled with a filler substance, which may be a mobile, substantially incompressible substance such as grease. A piston 136 is slidably mounted in the chamber 132, and has an outer end face 137 exposed to the external environment through the open end 134 of the cylinder and an inner end face 138 on which an O-ring seal 139 is mounted in a dovetail shaped groove 140. A sliding gland seal 141 is mounted on the outer surface of piston 136 to seal the chamber against ingress of fluid from the outer environment. A threaded mounting shaft 142 projects from end wall 134 of the housing, and an outlet passageway or bore 144 extends through the end wall 134 and shaft 142. An O-ring seal 145 is also mounted on the outer face of end wall 134, and the shaft 142 has external screw threads for mounting the unit in a seat in the end wall 75 of the multiple cable termination assembly 34.

The multiple cable termination assembly 34 of FIGS. 12 and 13 has a modified end wall 75 which has through bores 146 for seating each of the cable termination modules, as in the embodiment of FIG. 10, but additionally has a compensator unit seat 148 adjacent some or all of the module seating through bores 146. Each cable termination module is sealed in the respective bore 146 by spaced O-ring seals 152 mounted in grooves 78, as illustrated in FIG. 13. Each module seating bore 146 will have an annular race or groove 149 which is aligned with a port 150 in the outer housing of a cable termination module when seated in the bore, as indicated in FIG. 13. The port 150 communicates with chamber 40 which contains the solid material. Each seat 148 comprises a circular recess or indent for receiving the end wall 134 of the compensator unit, and a blind bore extending inwardly from the center of the recess and having a first, threaded portion 155 for threaded engagement with the threaded stem or shaft 142 of the unit 130, and a second bore portion 156 extending to the inner end wall 158 of the blind bore. A transverse passage 160 connects the bore portion 156 to the race 148 in the adjacent termination module seating bore 146, as best illustrated in FIG. 13. The pair of O-ring seals 152 mounted on the outer surface of the module 80 on each side of the port 50 and race 149 are in sealing engagement with the inner surface of the mounting bore 146, to provide a high pressure barrier. As noted above, only some of the termination modules may be connected to pressure compensation units 130, and such units may not be needed in all cases.

Operation of the pressure compensator unit will now be described in more detail. On initial installation of the cable termination modules and compensator units, each chamber 135 will be filled with grease or other mobile incompressible substance, and the piston 136 will be located at the rear end of the chamber, as in FIG. 11. As the outside environmental pressure increases beyond that within the chamber 135, the pressure gradient across the piston causes it to move inward in sealing, sliding engagement with the inner wall of the cylinder. The inward motion will force grease out of the chamber 135, along passageways 144, 156 and 160, and around the race 149, from where it will travel through port 150 to fill any voids or gaps in the solid material within the compensation chamber. A boot seal (not illustrated) may be added where the conductors 64 break out of cable core 56 into chamber 40.

If and when all the grease in chamber 135 has been transferred into the passageways, the piston hits the end wall 134 of the cylinder and stops. The piston will then remain sealed against the end wall 134, with a second seal being created between end face 138 of the piston and the end wall 134 via O-ring seal 139. At this point, no further compensation for outside overpressure takes place. The amount of overpressure which can be compensated in this embodiment is therefore limited by the volume of chamber 135. If the pressure in the interior of the termination chamber 40 should rise for some reason, for example due to temperature increase, the piston can slide outward in chamber 135 to allow some grease to re-enter the chamber so as to equalize the pressures while retaining the integrity of the sealed system.

In the embodiment of FIGS. 11 to 13, the chamber 135 in which the piston slides is of uniform diameter, such that the piston is in sealing engagement with the inner cylindrical wall of the chamber at all times. In an alternative embodiment, the chamber diameter may be increased at its inner end, as illustrated in FIG. 14. FIG. 14 illustrates a modified pressure compensator unit 170 in which the through bore of the cylinder has a first portion 172 of a first diameter and an end portion 174 of a second, larger diameter. Portion 172 has spaced linear grooves 173 extending up to the junction with portion 174. The unit 170 is otherwise identical to that of the previous embodiment, and like reference numerals are used for like parts, except for the fact that the piston 136 has no O-ring seal on its inner end face 138. The first portion 172 of the cylinder has a diameter substantially matching that of the piston, so that the gland seal 141 of the piston is in sliding, sealing engagement with the inner wall of the bore portion 172 when it is located in this part of the cylinder. However, when the piston 136 reaches its innermost travel point, bottoming out against the inner end wall, the piston extends into the larger diameter end portion 174, and the radial seal to the bore is lost. At this point, fluid from the outside environment, such as seawater when the cable termination assembly is used in a subsea environment, will be able to seep past the piston via grooves 173 and enlarged bore portion 172, and into the passage 144.

With the modified unit 170 of FIG. 14, when the grease originally in the chamber inside the cylinder has been transferred from the chamber, the fluid which seeps past the piston will continue pressure compensating the cable termination housing. In this case, there is no limit to the over pressure compensation, and this arrangement may be used where the external environment poses little or no threat of damage to the interior of the termination housing.

It will be understood that one pressure compensator unit 130 or 170 may be associated with each cable termination module in the multiple cable termination assembly, or only with selected cable termination modules in same cases. In the illustrated embodiment, four pressure compensator units are mounted in the end wall 75 in the embodiment illustrated in FIG. 12. A greater or lesser number of pressure compensator units may be used in other assemblies, depending on the number of cable termination units requiring pressure compensation. In a single cable termination module arrangement, the pressure compensator unit may be mounted in the bulkhead or panel through which the termination module extends, in a similar manner to the arrangement illustrated in FIGS. 12 and 13.

With the arrangement of FIGS. 11 to 13, grease may enter the end of the cable 32 or 92 if not completely covered by the filler material. This would not normally be a problem, but this possibility may be completely avoided, if desired, by using a break out boot seal where the individual jacketed wires 64 exit the cable. With the arrangement of FIG. 14, break out boot seals would be needed to minimize the risk of seawater entering the cable.

The pressure compensator units 130, 170 of FIGS. 11 to 14 are only two examples of possible pressure compensators which may be associated with selected cable termination modules. There are many other ways in which pressure compensation may be achieved. For example, a hollow, flexible member filled with grease or the like may be connected to the chamber 40. Those skilled in the field will recognize that other pressure compensator arrangements may be used.

In each of the foregoing embodiments, the termination chamber 40 of the cable termination module is substantially filled with a pourable material which cures to form a solid material which holds the individual conductors. However, when a pressure compensator unit 130 or 170 is associated with the cable termination module in the manner illustrated in FIGS. 12 and 13, the termination chamber 40 may instead be filled with a mobile material. In this case, the chamber 135 may be filled with the same material as chamber 40, or a compatible material. The pressure compensator unit will then act to compensate for any overpressure, reducing the risk of the possible failure modes in a mobile material filled termination chamber. The pressure compensator unit 130 shuts off automatically with a double seal when the compensation chamber is emptied.

The foregoing embodiments all involve cable termination assemblies for penetrating through a bulkhead or the like from a high to a low pressure environment. However, any of the modules of this invention may also be modified for use as a field installable cable to connector termination, simply by replacing the high pressure barrier 38 with the end of a suitable underwater connector plug or receptacle, for example an underwater connector as described in any of the U.S. Pat. No. 6,332,787 of Barlow et al., or U.S. Pat. Nos. 5,645,442 and 6,017,227 of Cairns, or other similar devices. Alternatively, a modified module may be used as a high pressure cable-to-cable splice, as described below.

FIG. 15 illustrates a cable-to-cable splice assembly 175 according to another embodiment of the invention for connecting a first cable 176 to a second cable 177. Some of the parts illustrated in FIG. 15 are identical to parts in the previous embodiments, and like reference numerals have been used as appropriate. The cables may be armored or unarmored, as with the termination modules of FIGS. 3 to 4 and 5 to 6. The splice assembly 175 basically comprises an outer cylindrical casing 178 having a first end for receiving the end of cable 176 and a second end for receiving the end of cable 177, with the cable ends being secured in the opposite ends of the casing 178 in exactly the same manner as described above in connection with the previous embodiments for either armored or unarmored cables.

A high pressure barrier 38 of dielectric material is mounted in the casing to separate the interior of the casing into a first chamber 179 on one side of the barrier 38, and a second chamber 180 on the other side of barrier 38. The barrier 38 is identical to the pressure barrier or plug described above in connection with the previous embodiments of FIGS. 2 to 9, and like reference numerals have been used for like parts as appropriate. It will be understood that the barrier may be for connection of corresponding electrical wires, optical fibers, or both, depending on whether the cables 176, 177 are electrical only, optical cables, or electro-optical cables. The outer casing is split into two halves along its center line to allow mounting of the barrier or plug 38 between chambers 179,180, the two halves then being mechanically joined together along their dividing line 182 by suitable known means. Double O-ring seals 44 are mounted in annular grooves on the outside of plug 38 to seal the chambers from one another. As in the previous embodiments, a plurality of sealed electrical feedthroughs or metal rods (not visible in the drawing) extend through the plug or barrier 38, and a solder pot covered by a boot seal 66 is provided at the opposite ends of each rod on each side of the barrier 38. It will be understood that, if the cables contain optical fibers, the barrier will also include one or more optical end seal or passthrough assemblies, as described above in connection with FIG. 9.

The end portions of each cable which project into the respective chambers 179,180 each have their outer jacket stripped off to expose the individual jacketed electrical wires or conductors 64. Conductors 64 are fanned out in the respective chambers and are each soldered in a respective solder pot 47 or 48 on opposite sides of the barrier, with the boot seals 66 forming a bridge between the dielectric base 38 and the insulating jacket of each wire, sealably containing the wires. It will be understood that the wires will be secured and sealed to the respective solder pots prior to assembly of the barrier 38 in casing 178.

Once assembly is complete, the two chambers 179 and 180 will each be filled with a pourable material via a pair of fill ports 184,185 which communicate with the respective chambers. Once the chambers are full, the fill ports will be sealed with plugs 186,187. The material then cures to form a solid filler in each chamber 179 and 180. The pourable material may be identical to that described above in connection with the previous embodiments.

FIG. 16 illustrates another modification in which a cable termination unit or module 190 is connected between the end of a cable 191 and the plug or receptacle half 192 of an underwater connector. It will be understood that a similar termination unit will be connected between the other half of the connector and a cable. The module 190 is identical to either the armored cable termination module of FIGS. 3 to 4 above, or the unarmored cable termination module of FIG. 5, or may be a hybrid cable termination module as in FIG. 7, depending on the type of cable and connector. The only difference between the cable termination module 190 of FIG. 16 and those of the previous embodiments is that the high pressure barrier or plug 38 of FIGS. 2 to 7 is replaced by the end plug or wall 194 of a connector half 192, and like reference numerals have been used for like parts as appropriate. Thus, the termination module 190 of FIG. 16 is a cable-to-connector splice.

The module 190 basically comprises a cylindrical outer housing or casing 35 having a first end secured to the end of cable 191 via fastener or end nut 53 acting with a retainer ring 193 which is seated in a detent (not visible) in cable 191. A similar retainer or snap ring is used in all of the previous embodiments, as illustrated in the drawings, apart from FIG. 2 where a set screw 54 is shown. Individual jacketed wires 94 extend from the end of the cable into chamber 40 within the cylinder. The opposite end of the casing 35 is secured to the end of connector half 192 via coupling nut 195. The outer side of end wall or end plug 194 will have a plurality of solder pots (not visible in the drawings) to which the ends of the wires 64 will be soldered, and then covered by boot seals 66. Metal rods extend from each of the solder pots through end plug 194 and terminate at individual contacts within the connector.

As in the previous embodiments, once the individual wires 64 have been connected to the contacts in end wall 194 and covered by boot seals, the chamber 40 will be filled with an initially flowable material via a fill port (not visible in FIG. 17). The material will then cure to form a solid filler for chamber 40, and a plug will be placed into the fill port.

The modules and multiple cable termination assembly of the present invention provide a fully sealed, high pressure, field installable cable termination assembly configured to allow termination of cables at high ambient pressures, i.e. in a way that is independent of application depth, and independent of the cable construction, whether armored or unarmored. These modules and the overall termination assembly substantially eliminate all common failure modes of the prior art FITAs, by providing an impenetrable barrier between the cable and the oil chamber. No part of the cable, apart from optical fibers in the case of optical or hybrid cables, enters the oil chamber, thus eliminating a number of previous causes of failure. Additionally, the solid module filler grips the individual conductors and reduces the risk of cable pistoning due to changing pressures or handling of cables.

In a multiple cable termination assembly, such as where various cables are terminated at an underwater equipment housing, each cable is terminated to a separate termination module, as illustrated in FIGS. 10, 12 and 13. The module creates a high pressure barrier between each cable and the interior of the underwater housing. The advantages of using individual modules for each cable are ease of handling, installation, and repair, individual testing, reduced manufacturing cost, and reliability. The use of a pressure compensator unit with each module may further increase reliability.

The respective modules are full mechanical and pressure barriers for the cable/compensation chamber interface. Individual electrical conductors do not enter the compensation chamber, so that the most common failure modes are significantly reduced in number or eliminated. The design of the cable termination module, whether cable to bulkhead, cable to cable, or cable to connector, eliminates the need for problematic breakout boot seals in the oil chamber where the individual wires or conductors leave the cable, as are currently used in prior art termination assemblies. The solid filler material in each cable termination chamber reduces the risk of cable pistoning due to changing pressure or user handling, and may be used with or without a boot seal where the individual conductors exit the cable.

Although some exemplary embodiments of the invention have been described above by way of example only, it will be understood by those skilled in the field that modifications may be made to the disclosed embodiments without departing from the scope of the invention, which is defined by the appended claims.

What is claimed is:

1. A field-installable cable termination module, comprising:
    an outer casing having a first end for sealably receiving the end of a cable and a second end, the casing having an internal chamber;
    at least one cable carrying at least one conductor, the cable having an end extending into the first end of the outer casing;
    a high pressure barrier plug in the casing sealing the internal chamber, the plug having a first side facing the chamber and a second side;
    at least one sealed feedthrough device extending through the barrier plug for connecting the conductor to the second side of the barrier plug;
    the conductor extending from the cable end through the internal chamber and being connected to the feedthrough device; and
    a solid material substantially filling the internal chamber and surrounding the conductor.

2. The module as claimed in claim 1, wherein the cable is an armored cable.

3. The module as claimed in claim 1, wherein the cable is an unarmored cable.

4. The module as claimed in claim 1, wherein the cable is a hybrid cable carrying optical fibers and electrical wires, the barrier having a first pass through device for the optical fibers and a plurality of separate electrical pass through devices for the electrical wires, each electrical pass through device having a connector at one end for connecting to a respective electrical wire.

5. The module as claimed in claim 1, wherein the conductor is a light conducting optical fiber.

6. The module as claimed in claim 1, wherein an outer tube carrying a plurality of optical fibers extends through the cable, the outer tube extending from the cable end through the chamber up to the feedthrough device, the solid material surrounding the outer tube.

7. The module as claimed in claim 1, wherein the conductor is an electrical wire and the pass through device comprises a solid conductive rod extending through the barrier and having a first connector at the first side of the barrier for connection to the wire and a second connector at the second side of the barrier.

8. The module as claimed in claim 7, wherein the cable carries a plurality of electrical wires, the barrier having a plurality of feedthrough devices comprising solid conductive rods extending through it for connection to the respective wires.

9. The module as claimed in claim 1, further comprising a socket member secured in the first end of the outer casing, the socket member having at least one through bore having a first end receiving the cable end and a second end through which the conductor extends into the chamber, the through bore having at least one seal member between the cable and bore.

10. The module as claimed in claim 9, wherein the cable is an unarmored cable and a cable gripping device is mounted in the socket member through bore for gripping the outer surface of the cable.

11. The module as claimed in claim 9, wherein the cable is an armored cable having an outer jacket, cable armor beneath the outer jacket, and an inner core beneath the cable armor through which the conductor extends, the through bore having a tapered portion extending from said first end and terminating short of said second end, the tapered portion defining a cable armor termination chamber, the outer jacket of the cable being stripped off in said termination chamber to reveal the cable armor, the cable armor being terminated in said termination chamber, and the termination chamber being substantially filled with a solid material.

12. The module as claimed in claim 1, wherein the solid material comprises an initially pourable material which cures to form said solid filler material.

13. The module as claimed in claim 12, wherein the pourable material is selected from the group consisting of pourable epoxy and pourable elastomer materials.

14. The module as claimed in claim 13, wherein the pourable material is a pourable electrically insulating epoxy resin.

15. A cable termination assembly, comprising:
    an outer casing having a first end for sealably receiving the end of a cable and a second end;
    the casing having an internal chamber;
    a high pressure barrier plug in the casing sealing the chamber, the plug having a first side facing said chamber and a second side;
    at least one pass through device sealably extending through the barrier plug for conductive communication between the first and second sides of the barrier plug;
    a cable carrying a plurality of conductors having an end extending into and sealed in the first end of said outer casing;
    the conductors extending from said cable end through said chamber up to said barrier plug, each conductor being connected to a pass through device; and
    the chamber being filled with a solid material for sealably supporting said conductors.

16. The assembly as claimed in claim 15, wherein the cable is a hybrid cable, some of said conductors comprising electrical wires and some comprising optical fibers, the barrier plug having a plurality of electrical pass through devices for connection to respective electrical wires and at least one optical pass through device for said optical fibers.

17. The assembly as claimed in claim 15, further comprising a second cable sealably received in the second end of said casing, the casing having a second chamber extending from the second side of said barrier plug up to said second end, conductors extending from said second cable through said second chamber up to said barrier plug, and said second chamber being filled with solid material, whereby said assembly comprises a cable-to-cable splice.

18. The assembly as claimed in claim 15, further comprising a connector unit of an underwater connector secured to the second end of the casing, the connector unit having an end wall comprising said barrier plug, said end wall having a plurality of pass through devices, and a plurality of contacts in said connector unit each connected to a respective one of said pass through devices, each conductor in said chamber being connected to a respective one of said pass through devices, whereby each conductor is connected to a respective one of said contacts, and said assembly comprises a cable-to-connector splice.

19. The assembly as claimed in claim 15, wherein at least some of the conductors comprise electrical wires, a plurality of electrical pass through devices extending through said barrier plug and each wire being connected to a respective one of said pass through devices.

20. The assembly as claimed in claim 19, wherein the cable is an electrical-only cable.

21. The assembly as claimed in claim 15, wherein at least some of the conductors comprise optical fibers, the cable having an outer tube for carrying said optical fibers, said outer tube extending through said chamber up to said barrier plug and said optical fibers extending into said pass through device.

22. The assembly as claimed in claim 21, wherein the cable is an optical-only cable.

23. A cable termination assembly, comprising:
a housing having a first end wall and a second end wall;
an oil filled, pressure compensated chamber extending from said first end wall to said second end wall;
at least one cable termination module extending through at least one of said end walls;
the module comprising an outer casing having a first end for sealably receiving the end of a cable carrying at least one conductor, a second end, and an internal chamber, a high pressure barrier plug in the casing sealing the chamber, at least one sealed feedthrough device extending through the barrier plug;
at least one cable carrying at least one conductor, the cable having an end extending into the first end of the termination module with the conductor extending from the cable end through the first chamber and being connected to the feedthrough device; and
a solid material filling the module chamber and surrounding the conductor to hold the conductor and resist collapse.

24. The assembly as claimed in claim 23, further comprising a plurality of cable termination modules extending through at least one end wall of said pressure compensated chamber, and a plurality of cables, each cable terminated in a respective one of said modules.

25. The assembly as claimed in claim 23, further comprising at least one pressure compensating unit mounted in said first end wall adjacent said termination module, said end wall having an internal passageway for connecting the pressure compensating unit to the chamber of the respective cable termination module.

26. The assembly as claimed in claim 25, wherein the pressure compensating unit comprises a housing having an internal chamber, a first open end exposed to the external environment outside said first end wall, and a second closed end having a passageway connecting the internal chamber to the internal passageway in said end wall, a piston sealably mounted in said internal chamber for sliding engagement with an inner wall of said chamber and movable between said first and second ends of said housing, the chamber being filled with a mobile, substantially incompressible material; whereby a pressure gradient across the piston between the outside environment and the internal chamber causes the piston to move towards the second end of the housing, thereby forcing the material out of said chamber and into said passageways.

27. A multiple cable termination assembly, comprising:
a housing having a first end wall and a second end wall;
an oil filled, pressure compensated chamber extending from said first end wall to said second end wall;
at least one cable termination module extending through said first end wall;
the module comprising an outer casing having a first end for sealably receiving the end of a cable carrying at least one conductor, a second end, and an internal chamber, a high pressure barrier plug in the casing sealing the chamber, at least one sealed feedthrough device extending through the barrier plug;
at least one cable carrying at least one conductor, the cable having an end extending into the first end of the termination module with the conductor extending from the cable end through the first chamber and being connected to the feedthrough device;
a solid material filling said module chamber and surrounding the conductor;
at least one pressure compensating unit mounted in said first end wall, associated with said termination module;
said end wall having internal passageways for connecting said pressure compensating unit to the chamber of the cable termination module; and
the pressure compensating unit comprising a housing having an internal chamber, a first open end, and a second closed end having a passageway connected to a respective internal passageway in said end wall, a piston sealably mounted in said internal chamber for sliding engagement with an inner wall of said chamber and movable between said first and second ends of said housing, the chamber being filled with a mobile, substantially incompressible material;
whereby a pressure gradient across the piston between the outside environment to which the open end of the compensating unit is exposed and the internal chamber causes the piston to move towards the second end of the housing, thereby forcing the mobile material out of said chamber and through said passageway in the second end of the pressure compensating unit, said internal passageway in said end wall, and up to the chamber of the cable termination module.

28. The assembly as claimed in claim 27, wherein the module chamber is substantially filled with a solid material and the mobile material from the associated pressure compensating module fills voids in the solid material.

29. The assembly as claimed in claim 27, wherein the piston of each pressure compensating unit has a first end facing the open end of the housing, a second end facing the second end of the housing, and an outer seal member forming a sliding seal between the piston and inner wall of the chamber.

30. A method of terminating a cable carrying a plurality of conductors, comprising the steps of:

stripping the outer cover from one end of a cable to expose the conductors;

connecting each conductor to a barrier plug at an end of a termination chamber within an outer casing of a cable termination module;

sealably connecting the outer cover of the cable adjacent the exposed conductors to a first end of the outer casing such that the conductors extend through the termination chamber up to the barrier plug;

filling the termination chamber with a pourable material through a fill port in the outer casing;

allowing the pourable material to cure to form a solid material surrounding and holding the conductors; and plugging the fill port in the outer casing.

31. A cable termination module, comprising:

an outer casing having a first end portion for sealably receiving the end of a cable;

a high pressure barrier plug in the casing;

at least one sealed feedthrough device extending through the barrier plug;

a termination chamber in the casing extending from the first end portion up to the high pressure barrier plug;

at least one cable carrying at least one conductor, the cable having an end extending into the first end portion of the casing;

the conductor extending from the cable end through the termination chamber and being connected to the feedthrough device; and a solid material filling the termination chamber from the cable end to the barrier plug and completely surrounding and supporting the conductor.

* * * * *